US008639050B2

(12) United States Patent
Gupta et al.

(10) Patent No.: US 8,639,050 B2
(45) Date of Patent: Jan. 28, 2014

(54) DYNAMIC ADJUSTMENT OF NOISE FILTER STRENGTHS FOR USE WITH DYNAMIC RANGE ENHANCEMENT OF IMAGES

(75) Inventors: Shalini Gupta, San Francisco, CA (US); Rajesh Narasimha, Plano, TX (US); Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 167 days.

(21) Appl. No.: 13/276,896

(22) Filed: Oct. 19, 2011

(65) Prior Publication Data

US 2012/0093433 A1    Apr. 19, 2012

Related U.S. Application Data

(60) Provisional application No. 61/394,647, filed on Oct. 19, 2010.

(51) Int. Cl.
*G06K 9/40*    (2006.01)

(52) U.S. Cl.
USPC ............................................ 382/261; 348/607

(58) Field of Classification Search
None
See application file for complete search history.

(56) References Cited

U.S. PATENT DOCUMENTS 4,352,105 A * 9/1982 Harney ...................... 250/338.1
7,072,525 B1 * 7/2006 Covell ........................... 382/261
7,711,200 B2 * 5/2010 Ouzilevski et al. ........... 382/254
2010/0278423 A1   11/2010 Itoh et al.
2011/0096988 A1 * 4/2011 Suen et al. .................... 382/168

OTHER PUBLICATIONS

Fan Zhai and Weider P. Chang, "Efficient Motion-Adaptive Noise Reduction Scheme for Video Signals", U.S. Appl. No. 13/186,439, filed Jul. 19, 2011, pp. 1-34.
Aziz Umit Batur and Rajesh Narasimha, "Scene Adaptive Brightness/Contrast Enhancement", U.S. Appl. No. 13/049,609, filed Mar. 16, 2011, pp. 1-38.

* cited by examiner

*Primary Examiner* — Barry Drennan
*Assistant Examiner* — Andrew Moyer
(74) *Attorney, Agent, or Firm* — Mirna Abyad; W. James Brady; Frederick J. Telecky, Jr.

(57) ABSTRACT

Dynamic adjustment of noise filter strengths for use with dynamic range enhancement of images is performed to produce better quality images by adapting dynamically to the image noise profile. Global and local brightness and contrast enhancement (GLBCE) is performed on a digital image to form an enhanced image. The GLBCE applies local gain values to the digital image based on local intensity values. A GLBCE gain versus intensity curve is determined for the enhanced image. A set of noise filter thresholds is adjusted in response to the GLBCE gain versus intensity curve to form a set of dynamically adjusted noise filter thresholds. The enhanced image is noise filtered using the set of dynamically adjusted noise filter thresholds to form a noise filtered enhanced image.

15 Claims, 8 Drawing Sheets

DYNAMIC ADJUSTMENT OF NOISE FILTER STRENGTHS FOR USE WITH DYNAMIC RANGE ENHANCEMENT OF IMAGES

CROSS-REFERENCE TO RELATED APPLICATIONS

This application claims benefit of U.S. Provisional Patent Application Ser. No. 61/394,647, filed Oct. 19, 2010, entitled "ADAPTATION OF IMAGE NOISE FILTER STRENGTHS FOR EFFECTIVELY REMOVING UNPREDICTABLE NOISE INTRODUCED BY DYNAMIC RANGE ENHANCEMENT ALGORITHMS" which is incorporated by reference herein in its entirety.

BACKGROUND OF THE INVENTION

1. Field of the Invention

Embodiments of the present invention generally relate to dynamic adjustment of noise filter strengths for use with dynamic range enhancement of images.

2. Description of the Related Art

Imaging and video capabilities have become the trend in consumer electronics. Digital cameras, digital camcorders, and video cellular phones are common, and many other new gadgets are evolving in the market. Advances in large resolution CCD/CMOS sensors coupled with the availability of low-power digital signal processors (DSPs) has led to the development of digital cameras with both high resolution image and short audio/visual clip capabilities. The high resolution (e.g., a sensor with a 2560×1920 pixel array) provides quality offered by traditional film cameras.

As the camera sensor and signal processing technologies advanced, the nominal performance indicators of camera performance, e.g., picture size, zooming, and range, reached saturation in the market. Because of this, end users shifted their focus back to actual or perceivable picture quality. The criteria users use in judging picture quality may include signal to noise ratio (SNR) (especially in dark regions), blur due to hand shake, blur due to fast moving objects, natural tone, natural color, etc.

The perceived quality of still images and video is heavily influenced by how the brightness/contrast of a scene is rendered, which makes brightness/contrast enhancement (BCE) one of the fundamental parts of an image pipeline. BCE is a challenging problem because human perception of brightness/contrast is quite complex and is highly dependent on the content of a still image or video frames. Many current BCE methods do not adequately address this complexity. When tested on large sets of images, these methods may fail in certain scenes (e.g., flat objects, clouds in a sky) because image content is very diverse. That is, many current BCE methods apply a fixed technique to all images/frames regardless of content and, as a result, may produce poor quality results on some images/frames because they do not adapt to content variation.

Research efforts in tone related issues have been focused on contrast enhancement (CE), which is further classified into global CE and local CE. More particularly, techniques for global CE and local CE may be realized by global histogram equalization (global HE or HE) and local histogram equalization (local HE or LHE), respectively. The histogram of an image, i.e., the pixel value distribution of an image, represents the relative frequency of occurrence of gray levels within the image. Histogram modification techniques modify an image so that its histogram has a desired shape. This is useful in stretching the low-contrast levels of an image with a narrow histogram. Global histogram equalization is designed to remap input gray levels into output gray levels so that the output image has flat occurrence probability (i.e., a uniform probability density function) at each gray level, thereby achieving contrast enhancement. The use of global HE can provide better detail in photographs that are over or under-exposed. However, such plain histogram equalization cannot always be directly applied because the resulting output image is excessively enhanced (over-enhancement) or insufficiently enhanced (under-enhancement).

Local histogram equalization (LHE) may be applied to alleviate some of the issues of global HE. In general, LHE enhances details over small areas (i.e., areas whose total pixel contribution to the total number of image pixels has a negligible influence on the global transform), which adjusts contrast on the basis of a local neighborhood, e.g., a block or sub-region, instead of the entire image. This approach helps with the under-enhancement issue.

Tests have shown that applying both global and local contrast enhancement outperforms the use of global contrast enhancement alone in almost all cases.

SUMMARY OF THE INVENTION

Dynamic adjustment of noise filter strengths for use with dynamic range enhancement of images is performed to produce better quality images by adapting dynamically to the image noise profile. Global and local brightness and contrast enhancement (GLBCE) is performed on a digital image to form an enhanced image. The GLBCE applies local gain values to the digital image based on local intensity values. A GLBCE gain versus intensity curve is determined for the enhanced image. A set of noise filter thresholds is adjusted in response to the GLBCE gain versus intensity curve to form a set of dynamically adjusted noise filter thresholds. The enhanced image is noise filtered using the set of dynamically adjusted noise filter thresholds to form a noise filtered enhanced image.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

As used herein, the term digital image data refers to pixels in a digital image. A digital image may be a single still digital image or a frame (or subset of a frame such as, for example, a slice, a field, a video object plane, a picture, etc.) of digital image data in a digital video sequence. The term digital image data may also refer to luminance data and/or chrominance data of pixels. For example, a block of digital image data may be composed of pixels having both luminance data and chrominance data, pixels having only luminance data, or pixels having only chrominance data.

Figure 1A:
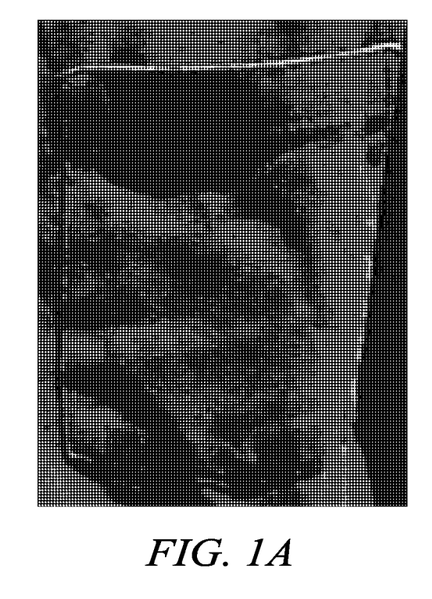
FIGS. 1A, 2A, and 3A illustrate images with GLBCE off and pre-defined noise filter strengths.
Figure 1B:
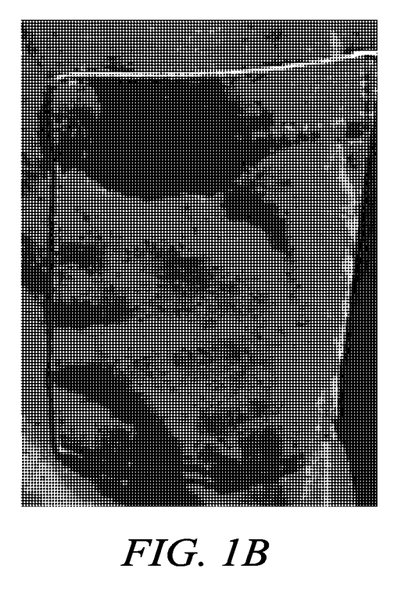
FIGS. 1B, 2B, and 3B illustrate images with GLBCE on and pre-defined noise filter strengths.
Figure 1C:
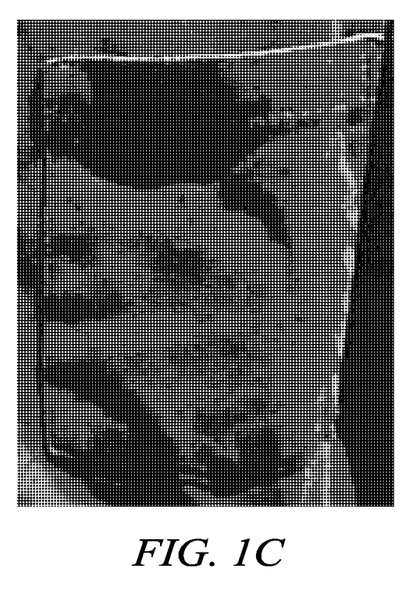
FIGS. 1C, 2C and 3C illustrate images with GLBCE on and dynamically adapted noise filter strengths.
Figure 2A:
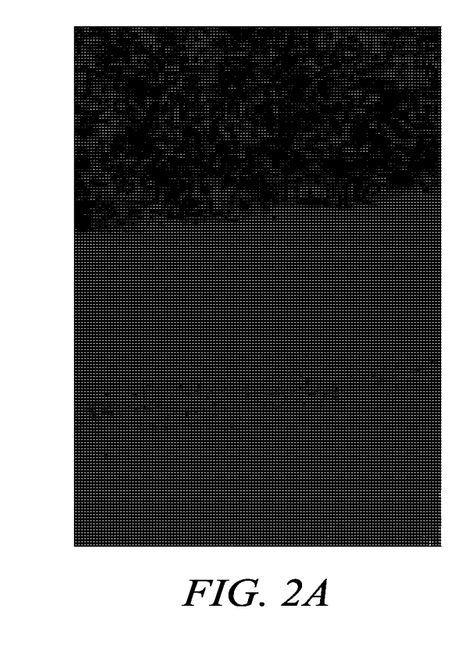
Figure 2B:
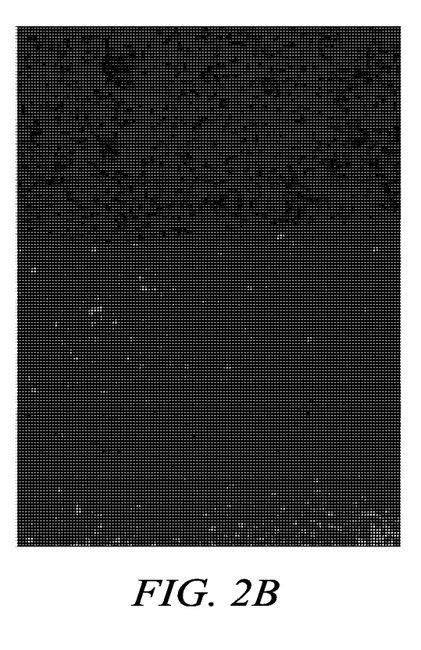
Figure 2C:
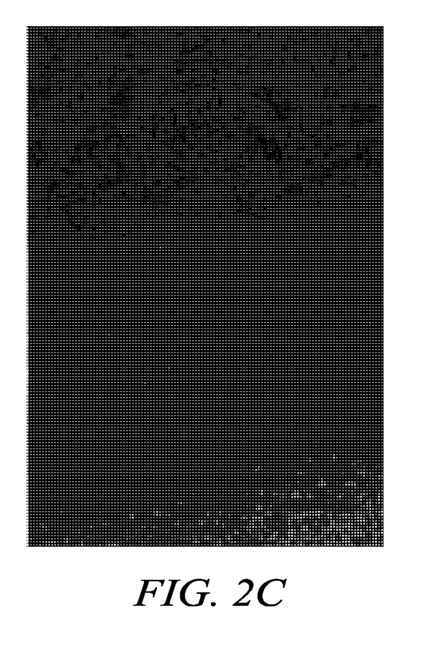
Figure 3A:
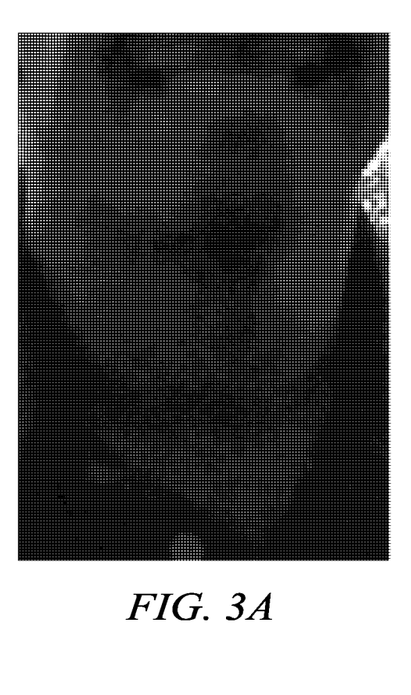
Figure 3B:
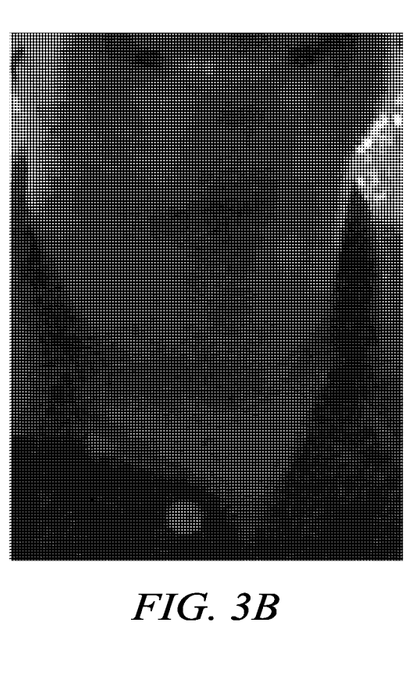
Figure 3C:
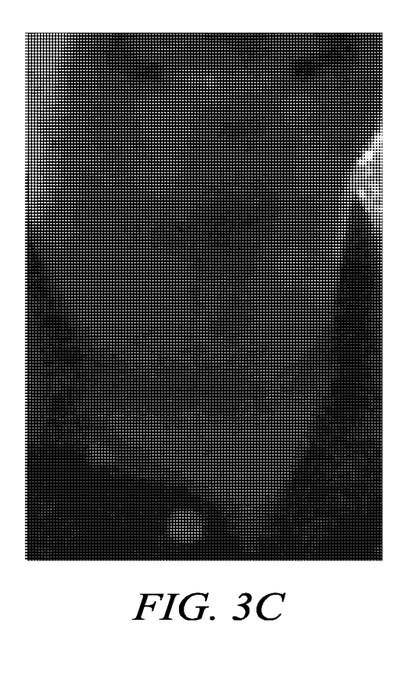

Algorithms for global and local brightness and contrast enhancement may be applied in image signal processing (ISP) pipes to globally and locally enhance the tone/brightness of digital images. FIGS. 1A, 2A, and 3A illustrate images with GLBCE off and pre-defined noise filter strengths; FIGS. 1B, 2B, and 3B illustrate images with GLBCE on and pre-defined noise filter strengths; and FIGS. 1C, 2C and 3C illustrate images with GLBCE on and dynamically adapted noise filter strengths. GLBCE algorithms apply a gain to dark image regions to brighten them. However, an undesirable byproduct of this process is the enhancement of the already high noise in the dark regions of the image, as illustrated in FIGS. 1B, 2B, and 3B. Often times this enhanced noise introduced by GLBCE becomes perceptually annoying and thus degrades overall image quality.

Various types of global and local brightness and contrast enhancement may be used. For example, a type of global and local brightness and contrast enhancement may use histogram-tone curve pairs, as described in more detail in U.S. patent application Ser. No. 13/049,609, "Scene Adaptive Brightness/Contrast Enhancement", filed 16 Mar. 2011, which is incorporated by reference herein in its entirety.

Another type of global and local brightness and contrast enhancement (GLBCE) may use local significance metrics, as described in more detail in US Patent Publication 20100278423, "Methods and Systems for Contrast Enhancement", filed 30 Apr. 2009, which is incorporated by reference herein in its entirety.

The image noise introduced by GLBCE is challenging to remove. This is because GLBCE changes the image noise profile in an unpredictable manner, which varies from image to image. The unpredictability comes from the fact that GLBCE algorithms adapt the gain values for every image on the fly based on their contents. Furthermore, the gain values applied by GLBCE vary for local regions of an image.

A known method employed in ISP pipes for configuring the post GLBCE noise filter strengths is to employ a number of sets of pre-defined noise filter settings for images acquired under different imaging conditions; for example, from the brightest to the darkest. In some cases, five or six sets of pre-defined noise filter settings may be used. These noise filter settings are carefully calibrated to a priori known noise profiles of a particular sensor for different imaging conditions. An Optical Electrical Conversion Function (OECF) chart captured using a uniform lighting source may be used to determine the noise level for different intensities. The 12 uniform gray patches on the OECF chart provide 12 power levels, which may then be used to arrange noise using either a linear or square-root model depending on the sensor and gain (or ISO) level. While this approach is effective in removing image noise when GLBCE is off, it fails when GLBCE is turned on and alters the image noise profiles in unpredictable ways. With GLBCE on, the approach of using pre-defined noise filter strengths may result in either under filtering and the appearance of perceptually annoying image grain (noise), or over filtering and a significant loss of image resolution and detail. In summary, due to the dynamic nature of image noise profiles when GLBCE is enabled, effectively removing it is a challenge to producing high quality digital images.

An embodiment of the invention dynamically adapts the noise filter strengths for each image, using information about the unique local gain values that are applied by the GLBCE algorithm to the image. A practical and successful technique for dynamically computing and applying the noise filter strength adaptation values for each image will now be described.

The technique starts by computing the local average image values (y), and the gain values (g) that are applied by the GLBCE algorithm. These values may be returned directly by the GLBCE algorithm. Alternatively, if a GLBCE algorithm does not return the local average gain values, they may be computed from the pre and post GLBCE images. Specifically, the pre and post GLBCE Bayer images of size w×h are first converted to gray scale images of size w/2×h/2. They are divided into sets of N non-overlapping blocks (typically 8×11=88) and the average intensity values of all blocks are computed. The local gain values applied to the image by the GLBCE algorithm are computed by point-wise dividing the N average intensity values of the post GLBCE image by the corresponding N average intensity values of the pre GLBCE image.

Figure 4:
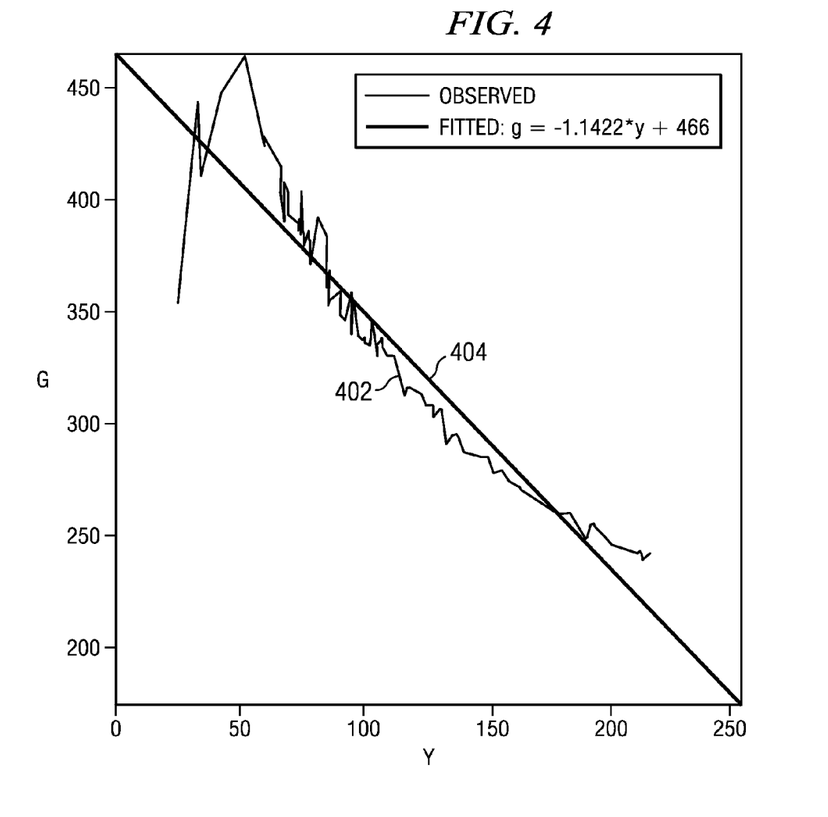
FIG. 4 is a plot illustrating an example of observed and fitted curves for average image intensity vs. GLBCE gain.

FIG. 4 is a plot illustrating an example of observed and fitted curves for average image intensity vs. GLBCE gain. The gain values applied by GLBCE typically vary with the image pixel intensity values, as illustrated by plot 402. A linear curve 404 may be fitted to the relationship between the N average intensity values (y) and their respective N GLBCE gain values (g) as shown by equation 1.

$$g = a_g y + b_g, \quad (1)$$

where, $a_g$ is the slope and $b_g$ is the intercept of the linear curve. A linear least squares fitting procedure may be employed and the slope and intercept of the linear fitted curve may be computed as shown by equations 2 and 3.

$$a_g = \frac{\sum_{i=0}^{N-1} (y_i - \mu_y)(g_i - \mu_g)}{\sum_{i=0}^{N-1} (y_i - \mu_y)^2} \quad (2)$$

$$b_g = \mu_g - a\mu_y \quad (3)$$

where $\mu_y$ and $\mu_g$ are the mean values for the N average intensity and gain values, respectively.

In this embodiment, the gain is scaled by 256; therefore, using this linear curve, the non-scaled gain values for y=0 and y=255 may be computed as shown in equations 4 and 5.

$$g_0 = b/256 \quad (4)$$

$$g_{255} = (a*255+b)/256 \quad (5)$$

To avoid erroneously fitted linear curves, which may result for data which do not span the entire dynamic range of the image, such as (0-255) for eight bit pixels, the $g_o$ value may capped at a maximum value, such as 2.000, and the $g_{255}$ value may be limited to a minimum of value, such as 0.781 for this embodiment.

Typically, predefined noise filtering thresholds ($T_n$), which control the noise filtering strengths, also vary linearly with input pixel intensities as shown in equation 6.

$$T_n = a_n y + b_n, \quad (6)$$

where $a_n$ and $b_n$ are the slope and intercept of a linear curve, respectively. This linear curve defines filter thresholds that are modeled for the case where GLBCE is turned off.

As discussed above, the predefined filter thresholds do not work well on an image that has been globally and locally BCE'd due to the unpredictability of the enhancement gain. For this example, when GLBCE is enabled for an image, using the computed $g_0$ and $g_{255}$ values (Equation 4-5), an adjusted noise filter slope ($a_n'$) and intercept ($b_n'$) values may be computed as shown in equations 7 and 8.

$$b_n' = b_n * g_0 \quad (7)$$

$$a_n' = (a_n + b_n) * g_{255} - b_n * g_0 \quad (8)$$

Referring back to FIGS. 1-3, example images depict the result of this solution. It may be observed that the perceptual noise of the images illustrated in FIGS. 1C, 2C, and 3C, where noise filter strengths were dynamically adapted for GLBCE gains is significantly less than of the images illustrated in FIGS. 1B, 2B and 3B where GLBCE was enabled, but not adapted to GLBCE gains. Notice that perceptual noise in FIGS. 1C, 2C, and 3C is similar to that of the images in FIGS. 1A, 2A, and 3A, where GLBCE was turned off.

This solution is superior to the method of employing predefined noise filter strengths for post GLBCE noise filtering in a number of respects. Firstly, it produces better quality images by adapting dynamically to the image noise profile. It not only increases the noise filtering strength for regions that have boosted noise due to GLBCE, but also reduces the noise filter strength for regions of the image, wherein, the noise is suppressed by GLBCE. Secondly, it is elegant in that it automatically adapts precisely to each individual image's altered noise profile post GLBCE, and does not require manual tuning, which is time consuming and often erroneous. Thirdly, it may be easily included into existing digital imaging pipelines.

Figure 5:
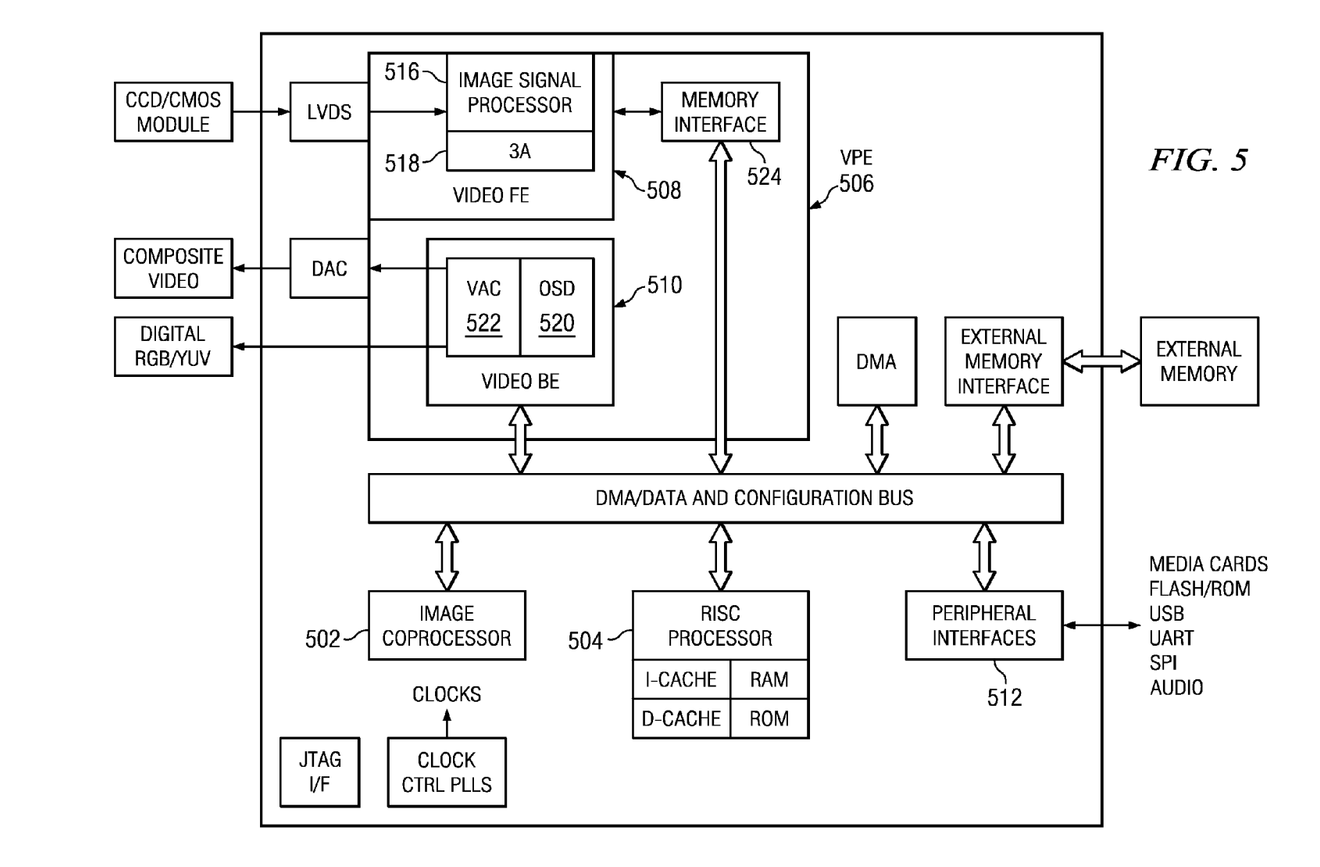
FIG. 5 shows a digital system in accordance with one or more embodiments of the invention.

FIG. 5 shows a digital system suitable for an embedded system in accordance with one or more embodiments that includes, among other components, a DSP-based image coprocessor (ICP) 502, a RISC processor 504, and a video processing engine (VPE) 506. The RISC processor 504 may be any suitably configured RISC processor. The VPE 506 includes a configurable video processing front-end (Video FE) 508 input interface used for video capture from imaging peripherals such as image sensors, video decoders, etc., a configurable video processing back-end (Video BE) 510 output interface used for display devices such as SDTV displays, digital LCD panels, HDTV video encoders, etc, and memory interface 524 shared by the Video FE 508 and the Video BE 510. The digital system also includes peripheral interfaces 512 for various peripherals that may include a multi-media card, an audio serial port, a Universal Serial Bus (USB) controller, a serial port interface, etc.

The Video FE 508 includes an image signal processor (ISP) 516, and a 3A statistic generator (3A) 518. The ISP 516 provides an interface to image sensors and digital video sources. More specifically, the ISP 516 may accept raw image/video data from a sensor (CMOS or CCD) and can accept YUV video data in numerous formats. The ISP 516 also includes a parameterized image processing module with functionality to generate image data in a color format (e.g., RGB) from raw CCD/CMOS data. The ISP 516 is customizable for each sensor type and supports video frame rates for preview displays of captured digital images and for video recording modes. The ISP 516 also includes, among other functionality, an image resizer, statistics collection functionality, and a boundary signal calculator. The 3A module 518 includes functionality to support control loops for auto focus, auto white balance, and auto exposure by collecting metrics on the raw image data from the ISP 516 or external memory. In one or more embodiments, the Video FE 508 is configured to dynamically adjust noise filter strengths for use after GLBCE as described herein.

The Video BE 510 includes an on-screen display engine (OSD) 520 and a video analog encoder (VAC) 522. The OSD engine 520 includes functionality to manage display data in various formats for several different types of hardware display windows and it also handles gathering and blending of video data and display/bitmap data into a single display window before providing the data to the VAC 522 in YCbCr format. The VAC 522 includes functionality to take the display frame from the OSD engine 520 and format it into the desired output format and output signals required to interface to display devices. The VAC 522 may interface to composite NTSC/PAL video devices, S-Video devices, digital LCD devices, high-definition video encoders, DVI/HDMI devices, etc.

Memory interface 524 functions as the primary source and sink to modules in the Video FE 508 and the Video BE 510 that are requesting and/or transferring data to/from external memory. The memory interface 524 includes read and write buffers and arbitration logic.

ICP 502 includes functionality to perform the computational operations required for compression and other processing of captured images. The video compression standards supported may include one or more of the JPEG standards, the MPEG standards, and the H.26x standards. In one or more embodiments of the invention, the ICP 502 is configured to perform computational operations for a BCE and noise filter strength adaptation method as described herein.

In operation, to capture an image or video sequence, video signals are received by the video FE 508 and converted to the input format needed to perform video compression. Prior to the compression, a BCE method followed by noise filtering using dynamically adjusted filter thresholds as described herein may be applied as part of processing the captured video data. The video data generated by the video FE 508 is stored in the external memory. The video data is then encoded, i.e., compressed. During the compression process, the video data is read from the external memory and the compression computations on this video data are performed by the ICP 502. The resulting compressed video data is stored in the external memory. The compressed video data is then read from the external memory, decoded, and post-processed by the video BE 510 to display the image/video sequence.

Figure 6:
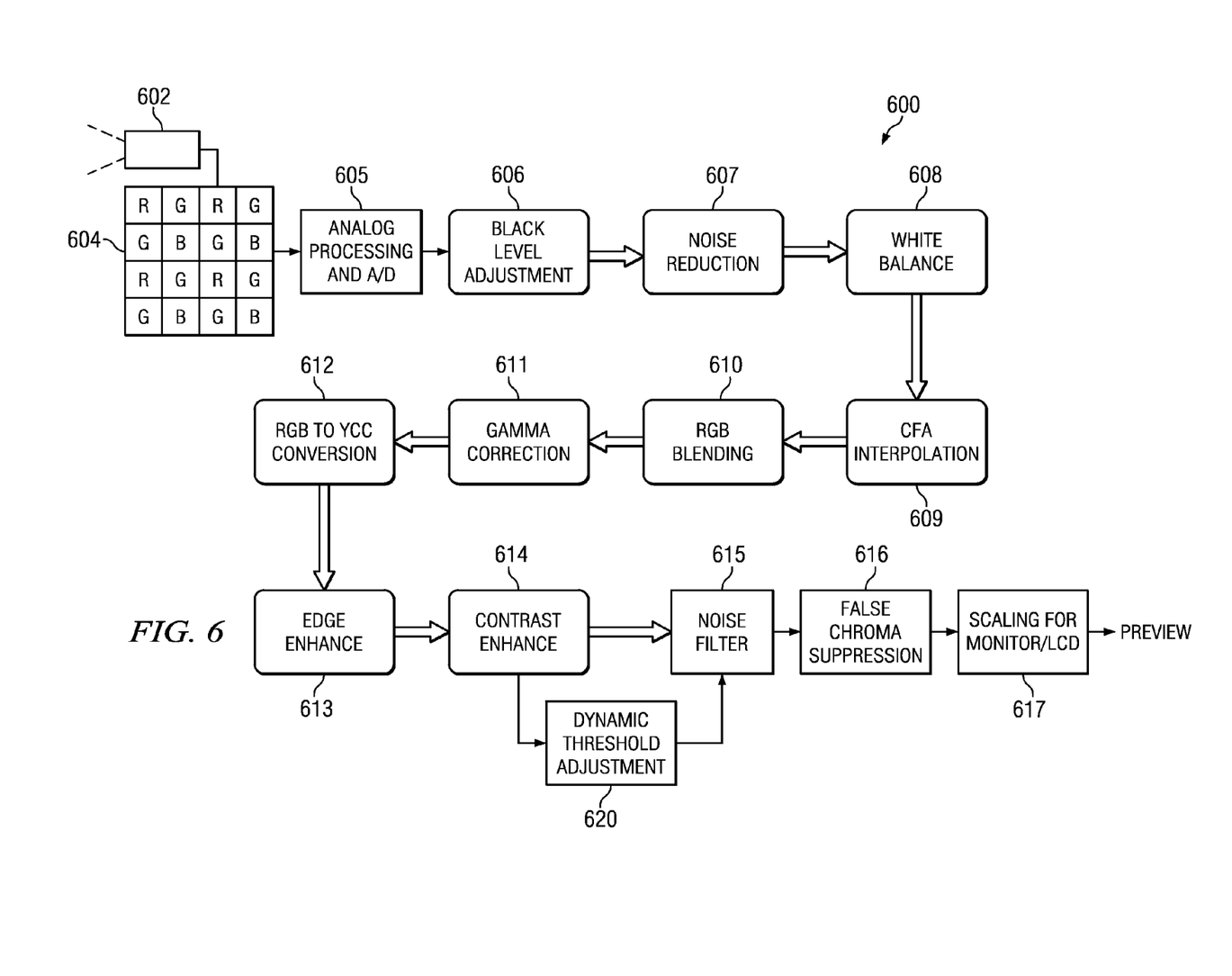
FIG. 6 shows a block diagram of an image processing pipeline in accordance with one or more embodiments of the invention.

FIG. 6 is a block diagram illustrating digital camera control and image processing pipeline 600, referred to herein as the "image pipeline", in accordance with one or more embodiments. One of ordinary skill in the art will understand that similar functionality may also be present in other digital devices (e.g., a cell phone, PDA, etc.) capable of capturing digital images and/or digital video sequences. While each stage in the pipeline is shown in sequence, one of ordinary skill in the art will understand that image processing is parallel in nature and thus, each stage in the pipeline does not necessarily receive an entire digital image before processing can begin. Further, one of ordinary skill in the art will understand that that an image pipeline may contain more or fewer stages, and/or may vary in order. A brief description of the function of each stage in accordance with one or more embodiments is provided below. Note that the typical color CCD (charge coupled device) 604 that receives an image from camera lens assembly 602 consists of a rectangular array of photosites (pixels) with each photosite covered by a filter that forms a color filter array (CFA): typically, red, green, or blue (RGB). In the commonly-used Bayer pattern CFA, one-half of the photosites are green, one-quarter are red, and one-quarter are blue. Analog processing logic 605 scans the CCD and converts the analog signals returned by the CCD into a stream of digital image data.

As shown in FIG. 6, an initial stage 606 of the pipeline, black level adjustment, sets sensor black to image black. That is, in order to optimize the dynamic range of the pixel values represented by a CCD imager, the pixels representing black are corrected since the CCD cell may record some non-zero current at these pixel locations. The black level adjustment adjusts for this difference by subtracting offsets from each pixel value while clamping/clipping to zero to avoid a negative result. One simple way to calculate this adjustment is to take a picture of complete black, e.g., by leaving on the lens cap or camera cover. The result of the calculation is the three base offsets that characterize the dark current from the sensor and lens flare. Failure to subtract these offsets may have a negative effect on contrast in the final image.

Noise reduction stage 607 attempts to remove the various sources of noise in a digital image, e.g., optical, electrical, digital and power, by averaging similar neighboring pixels. Typically, if the noise level is high then more weight is given to the average of similar neighbors. Conversely, if the noise level is low, more weight is given to the original pixel value. An Optical Electrical Conversion Function (OECF) chart captured using a uniform lighting source may be used to determine the noise level for different intensities. The 12 uniform gray patches on the OECF chart provide 12 power levels, which may then be used to arrange noise using either a linear or square-root model depending on the sensor and gain (or ISO) level.

White balance stage 608 attempts to make a white scene appear as white in a digital image by automatically compensating for color differences introduced by light sources, such as the differences between incandescent, fluorescent, natural light sources, XE strobe, and W-LED flash, as well as mixed light conditions. That is, the illumination during the recording of a scene in a digital image may be different from the illumination when viewing the final digital image. This difference may result in a different color appearance that may be seen, for example, as the bluish appearance of a face or the reddish appearance of the sky. Also, the sensitivity of each color channel varies such that grey or neutral colors may not be represented correctly.

In some embodiments, the white balance function compensates for these imbalances in colors by computing the average brightness of each color component and by determining a scaling factor for each color component. Since the illuminants are unknown, a frequently used technique just balances the energy of the three colors. This equal energy approach requires an estimate of the unbalance between the color components. In some embodiments, the appropriate gains needed for white balance may be calculated using a ColorChecker chart to obtain the average RGB values of six gray patches. The red and blue gains may be computed using mean square error minimization while the green gain may be set to one, eliminating one set of calculations.

Many digital cameras have a single sensor and thus are limited to obtaining one color component at each pixel in a digital image even though three components are needed to represent RGB color. However, many stages of the image pipeline need full color resolution for each pixel in a digital image. CFA interpolation stage 609 interpolates the two missing color components for each pixel from neighboring pixels.

RGB blending stage 610 is included because different sensors may produce different RGB values for the same color. This stage uses a matrix that converts the sensor RGB color space to a standard RGB color space such as the Rec709 RGB color space. The matrix may be determined using an image of a ColorChecker chart to obtain average RGB values of 18-color patches after white balancing, and then using constrained minimization on reference RGB values after applying an inverse Gamma correction.

Gamma correction stage 611 compensates for the nonlinearity of output display devices and printers, i.e., it compensates for the differences between a digital image generated by the CCD sensor and the digital image displayed on a display device or printed on a page. A standard gamma correction such as Rec709 or SMPTE240M may be used to calibrate this stage. Special displays, such as those used in airport computers or military applications, may require nonstandard gamma correction. In such cases, a particular gamma correction lookup table for the special display may be used for gamma correction.

Human eyes are more sensitive to luminance (Y) than color (Cb, Cr) information, and so each component may be processed using different precisions. RGB to YCC conversion stage 612 transforms a digital image from an RGB color space to a YCbCr color space. This conversion may be a linear transformation of each Y, Cb, and Cr value as a weighted sum of the R, G, and B values of a pixel.

The nature of CFA interpolation filters introduces a low-pass filter that smoothes the edges in the image. To sharpen a digital image, edge enhancement stage 613 detects and enhances the edges. The edge enhancement may compute the edge magnitude in the Y channel at each pixel, and then scale the edge magnitude and add it to the original luminance (Y) image to enhance the sharpness of the edges.

Brightness and contrast enhancement stage 614 enhances the brightness and contrast of a digital image. This stage performs global and local brightness and contrast enhancement according to a method for GLBCE as described herein.

Filter stage 615 performs threshold based filtering of the GLBCE image using dynamic adjustment of noise filter strengths as described herein. Gaussian noise and impulse noise (also called salt and pepper noise in the television (TV) signal scenario) are the two most common types of noise in digital images. Techniques for removing or reducing Gaussian noise and impulse noise have been widely studied. Typical Gaussian noise reduction schemes can be classified into LTI (linear time invariant), nonlinear filters, and more advanced techniques. LTI filters include regular FIR filter, LMMSE (linear minimum mean squared error) and Weiner filter. LTI filters usually are not sufficient since they may smooth out high frequency textures. Nonlinear filters such as a median filter, its derivatives such as a weighted median filter, and a bilateral filter are usually more efficient and simple to implement in hardware. More advanced techniques include a local adaptive LMMSE filter, wavelet-based methods (wavelet transform itself is a linear operation, but wavelet-based methods usually require either soft or hard thresholding which is a nonlinear operation), and contour based techniques.

As for impulse noise reduction, linear filters usually do not work well. Typical schemes use a median filter. Regardless of whether the filter is linear or nonlinear, such filters tend to soften pictures to some extent.

In a video context, threshold based filtering may utilize information from several different frames, as described in more detail in U.S. patent application Ser. No. 13/186,439, "Efficient Motion-Adaptive Noise Reduction Scheme for Video Signals", filed 19 Jul. 2011, which is incorporated by reference herein.

Various embodiments of the invention may use these or other later developed filtering techniques in which filter thresholds are dynamically adjusted based on local image intensity as described herein. Dynamic threshold adjustment module 620 determines dynamically adjusted filter thresholds based on what gain was globally and locally applied to the enhanced image by BCE stage 614. Module 620 may be implemented as hardwired logic that performs the operations described above. In another embodiment, module 620 may be implemented in software that is executed on a processor that is coupled to the image pipeline, for example, that performs the GLBCE analysis, curve fitting, and threshold adjustment as described above.

False chroma suppression stage 616 corrects various color artifacts. For example, edge enhancement is only performed in the Y channel of a digital image. This may cause misalignment in the color channels at the edges, resulting in rainbow-like artifacts. The false chroma suppression stage suppresses the color components, Cb and Cr, at the edges to reduce such artifacts.

Finally, the image may be scaled 617 for display on a monitor, LCD (liquid crystal device), or other type of image display device.

Figure 7:
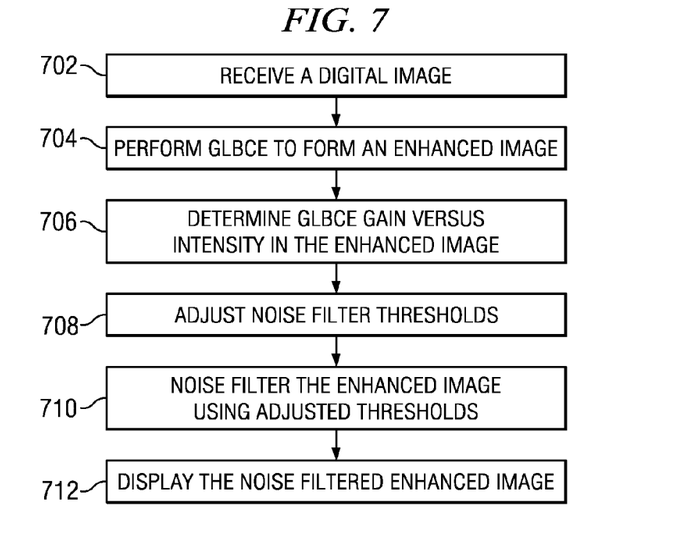
FIG. 7 shows a flow graph of a method for dynamic adjustment of noise filter strengths after global and local brightness and contrast enhancement in accordance with one or more embodiments of the invention.

FIG. 7 shows a flow graph of a method for dynamic adjustment of noise filter strengths after global and local brightness and contrast enhancement in accordance with one or more embodiments of the invention. A digital image is received 702 from an image source, such as a camera CCD. The digital image may also be received from a local storage device or from a remote storage location via wired or wireless network connection, for example, or be received over a cellular radio transmission network, for example.

Global and local brightness and contrast enhancement (GLBCE) is performed 704 on the digital image to form an enhanced image, wherein the GLBCE applies local gain values to the digital image based on local intensity values, as described in more detail above.

The local average image values (y), and the gain values (g) that are applied by the GLBCE algorithm are determined 706. These values may be returned directly by the GLBCE algorithm. Alternatively, if a GLBCE algorithm does not return the local average gain values, they may be computed from the pre and post GLBCE images. Specifically, the pre and post GLBCE Bayer or RGB images of size w×h are first converted to gray scale images of size w/2×h/2 or size w×h, respectively. They are divided into sets of N non-overlapping blocks (typically 8×11=88) and the average intensity values of all blocks are computed. The local gain values applied to the image by the GLBCE algorithm are computed by point-wise dividing the N average intensity values of the post GLBCE image by the corresponding N average intensity values of the pre GLBCE image.

A GLBCE gain versus intensity curve is determined 706 for the enhanced image. This may be done using a least squares criterion, or other known or later developed curve fitting scheme that produces a linear or non-linear representation of the operation of the GLBCE based on the current enhanced image.

A set of noise filter thresholds is adjusted 708 in response to the GLBCE gain versus intensity curve to form a set of dynamically adjusted noise filter thresholds, as described in more detail above.

The enhanced image is noise filtered 710 using the set of dynamically adjusted noise filter thresholds to form a noise filtered enhanced image. As discussed above, the noise filter may perform threshold based linear or non-linear filtering to remove Gaussian noise and impulse noise, as described above.

The noise filtered enhanced image may then be displayed 712 on a display screen, such as an LCD or other type of display device.

Determining 706 the GLBCE gain versus intensity curve for the enhanced image may include dividing the digital image and the enhanced image into respective sets of K=M*N blocks, computing an average intensity value of each block, dividing point-wise the K average intensity values of the enhanced image by the K average intensity values of the digital image to form a set of GLBCE gain versus intensity values, and fitting a curve to the GLBCE gain versus intensity values to form the GLBCE gain versus intensity curve.

The set of noise filter thresholds may be expressed as $$T_n = a_n y + b_n.$$

The adjusted threshold noise filter curve may be adjusted 708 by $$b_n' = b_n * g_0$$

$$a_n' = (a_n + b_n) * g_{255} - b_n * g_0$$

where gain values $g_0$ and $g_{255}$ are derived from the GLBCE gain versus intensity curve, as described in more detail above.

Other Embodiments

While the invention has been described with reference to illustrative embodiments, this description is not intended to be construed in a limiting sense. Various other embodiments of the invention will be apparent to persons skilled in the art upon reference to this description. For example, while equations 6-8 describe a threshold curve for a particular type of noise filter, other types of noise filters may have different forms of threshold curves that may be adjusted in a similar manner as described herein to compensate for GLBCE gain effects.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), digital signal processor (DSP),), or a graphics processing unit (GPU). The software that executes the techniques may be initially stored in a computer-readable medium such as compact disc (CD), a diskette, a tape, a file, memory, or any other computer readable storage device, and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 8:
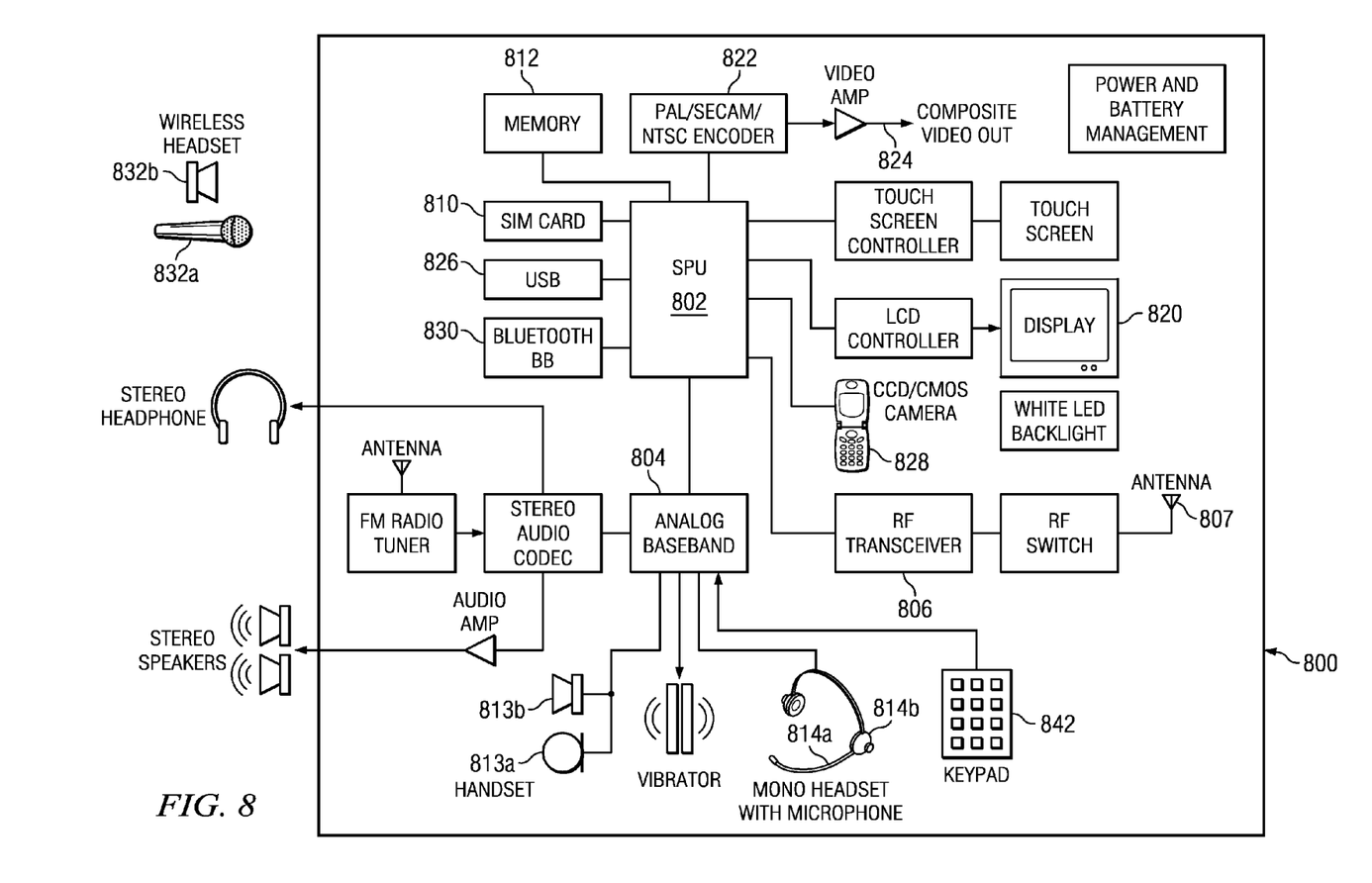
FIGS. 8 and 9 show illustrative digital systems in accordance with one or more embodiments.
Figure 9:
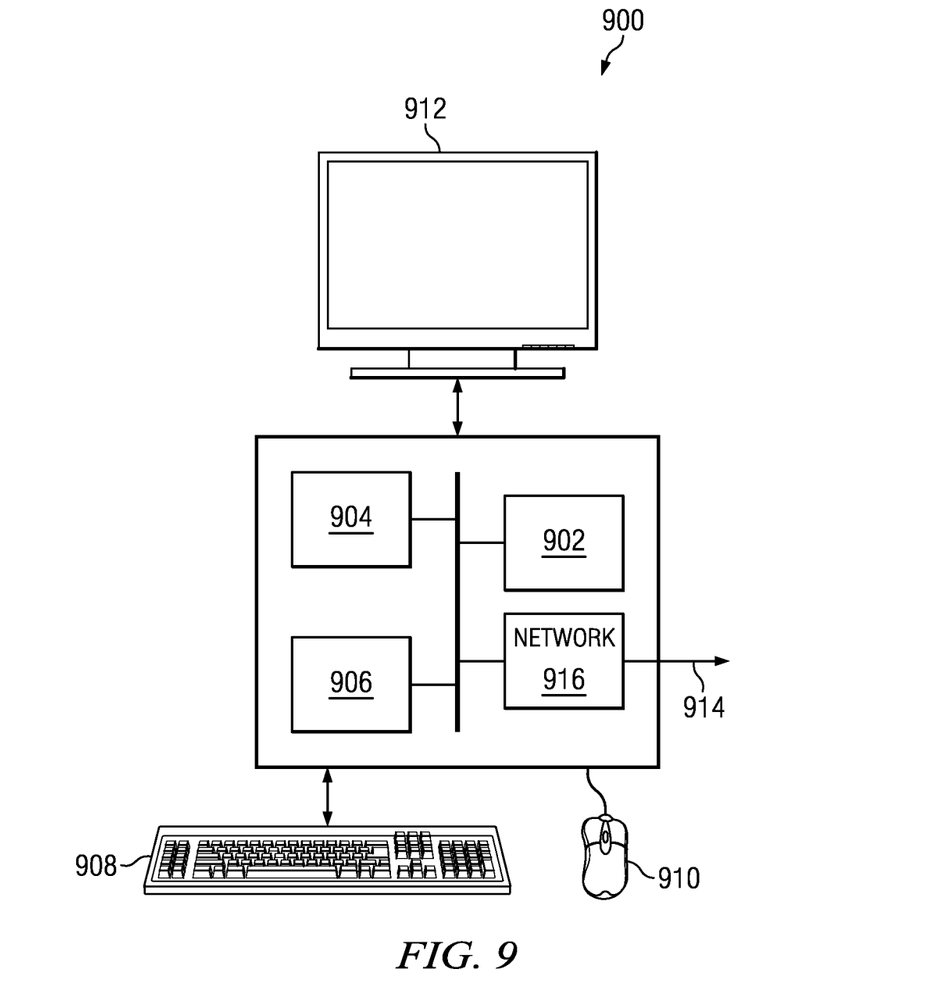

Embodiments of the methods and noise filters as described herein may be implemented for virtually any type of digital system (e.g., a desk top computer, a laptop computer, a handheld device such as a mobile (i.e., cellular) phone, a personal digital assistant, a digital camera, etc.) with functionality to capture and process digital images. FIGS. 8 and 9 are block diagrams of illustrative digital systems.

FIG. 8 is a block diagram of a digital system (e.g., a mobile cellular telephone) 800 that may be configured to apply dynamic adjustment of noise filter strengths for use with a dynamic range of GLBCE of images as described herein. The signal processing unit (SPU) 802 includes a digital signal processing system (DSP) that includes embedded memory and security features. The analog baseband unit 804 receives a voice data stream from handset microphone 813*a* and sends a voice data stream to the handset mono speaker 813*b*. The analog baseband unit 804 also receives a voice data stream from the microphone 814*a* and sends a voice data stream to the mono headset 814*b*. The analog baseband unit 804 and the SPU 802 may be separate ICs. In many embodiments, the analog baseband unit 804 does not embed a programmable processor core, but performs processing based on configuration of audio paths, filters, gains, etc being setup by software running on the SPU 802.

SPU unit 802 may send or receive data to various devices connected to universal serial bus (USB) port 826. DPU 802 can be connected to subscriber identity module (SIM) card 1010 and stores and retrieves information used for making calls via the cellular system. SPU 802 may also be connected to memory 812 that augments the onboard memory and is used for various processing needs. SPU 802 can be connected to Bluetooth baseband unit 830 for wireless connection to a microphone 832*a* and headset 832*b* for sending and receiving voice data.

Display 820 may also display pictures and video sequences received from a local camera 828, or from other sources such as the USB 826, SIMM card 810, or the memory 812. The SPU 802 may also send a video sequence to the display 820 that is received from various sources such as the cellular network via the RF transceiver 806 or the camera 828. The SPU 802 may also send a video sequence to an external video display unit via the encoder unit 822 over a composite output terminal 824. The encoder unit 822 may provide encoding according to PAL/SECAM/NTSC video standards.

RF transceiver 806 is a digital radio processor and includes a receiver for receiving a stream of coded data frames from a cellular base station via antenna 807 and a transmitter for transmitting a stream of coded data frames to the cellular base station via antenna 807. RF transceiver 806 is connected to SPU 802 which provides processing of the frames of encoded data being received and transmitted by cell phone 800.

The SPU 802 includes functionality to perform the computational operations required for video encoding and decoding. The video encoding standards supported may include, for example, one or more of the JPEG standards, the MPEG standards, and the H.26x standards. In one or more embodiments of the invention, the SPU 802 is configured to perform dynamic adjustment of noise filter strengths for use with a dynamic range of GLBCE of images as described herein. Software instructions implementing the BCE and dynamic noise filter threshold adjustment may be stored in the memory 812 and executed by the SPU 802, for example, as part of processing image sequences captured by the local camera 828.

FIG. 9 shows a digital system 900 (e.g., a personal computer) that includes a processor 902, associated memory 904, a storage device 906, and numerous other elements and functionalities typical of digital systems (not shown). In one or more embodiments of the invention, a digital system may include multiple processors and/or one or more of the processors may be digital signal processors. The digital system 900 may also include input means, such as a keyboard 908 and a mouse 910 (or other cursor control device), and output means, such as a monitor 912 (or other display device). Those skilled in the art will appreciate that the input and output means may take other forms. The digital system 900 may also include an image capture device (not shown) that includes circuitry (e.g., optics, a sensor, readout electronics) for capturing images or video sequences. Digital system 900 may be configured to apply GLBCE and perform noise filtering with dynamically adjusted noise filter thresholds as described herein to the captured images and video sequences. The digital system 900 may be connected to a network 914 (e.g., a local area network (LAN), a wide area network (WAN) such as the Internet, a cellular network, any other similar type of network and/or any combination thereof) via a network interface 916. Encoded video sequences may be received by the digital system 900 via the network and/or via a computer readable medium.

Further, those skilled in the art will appreciate that one or more elements of the aforementioned digital system 900 may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system 900 via removable computer readable media (e.g., floppy disk, optical disk, flash memory, USB key), via a transmission path from computer readable media on another digital system, etc.

Embodiments of the methods described herein can be useful for enhancing or improving several types of images. Further, embodiments of the methods may be applied to images as they are captured (e.g., by a digital camera or scanner), as part of a photoprocessing application or other application with image processing capability executing on a computer, and/or when the images are printed (e.g., in a printer as part of preparing to print the images). Embodiments of the methods may also be implemented as part of a device driver (e.g., a printer driver or display driver), so that the driver performs dynamic adjustment of noise filter strengths for use with a dynamic range of GLBCE of images as described herein before the image is displayed or printed.

While the invention has been described with respect to a limited number of embodiments, those skilled in the art, having benefit of this disclosure, will appreciate that other embodiments can be devised which do not depart from the scope of the invention as disclosed herein. It is therefore contemplated that the appended claims will cover any such modifications of the embodiments as fall within the true scope and spirit of the invention.

What is claimed is:

1. A method for noise filtering a digital image, the method comprising:
   performing global and local brightness and contrast enhancement (GLBCE) on the digital image to form an enhanced image, wherein the GLBCE applies local gain values to the digital image based on local intensity values;
   determining a GLBCE gain versus intensity curve for the enhanced image;
   adjusting a set of noise filter thresholds in response to the GLBCE gain versus intensity curve to form a set of dynamically adjusted noise filter thresholds; and
   noise filtering the enhanced image using the set of dynamically adjusted noise filter thresholds to form a noise filtered enhanced image.

2. The method of claim 1, wherein determining the GLBCE gain versus intensity curve for the enhanced image comprises:
dividing the digital image and the enhanced image into respective sets of K blocks;
computing an average intensity value of each block;
dividing point-wise the K average intensity values of the enhanced image by the K average intensity values of the digital image to form a set of GLBCE gain versus intensity values; and
fitting a curve to the GLBCE gain versus intensity values to form the GLBCE gain versus intensity curve.

3. The method of claim 2, wherein the GLBCE gain versus intensity curve is approximated as a linear curve in a least squares criterion.

4. The method of claim 1, wherein adjusting the set of noise filter thresholds uses the GLBCE gain versus intensity curve to form a dynamically adjusted noise filter threshold curve.

5. The method of claim 4, wherein the set of noise filter thresholds is expressed as $$T_n = a_n y + b_n$$

where y is an intensity value, $a_n$ is a slope value, and $b_n$ is an intercept value; and wherein the adjusted threshold noise filter curve is adjusted by $$b_n' = b_n * g_0$$

$$a_n' = (a_n + b_n) * g_{255} - b_n * g_0$$

where gain values $g_0$ and $g_{255}$ are derived from the GLBCE gain versus intensity curve.

6. The method of claim 1, further comprising displaying the noise filtered enhanced image on a display screen.

7. The method of claim 1, wherein the K blocks comprise a non-overlapping array of M*N rows and columns.

8. An image processing system comprising:
an image pipeline configured to receive a digital image, wherein the image pipeline comprises:
a global and local brightness and contrast enhancement (GLBCE) stage configured to performing global and local brightness and contrast enhancement (GLBCE) on the digital image to form an enhanced image, wherein the GLBCE applies local gain values to the digital image based on local intensity values;
dynamic threshold adjustment logic coupled to the GLBCE stage, wherein the dynamic threshold adjustment logic is configured to determine a GLBCE gain versus intensity curve for the enhanced image, and to adjust a set of noise filter thresholds in response to the GLBCE gain versus intensity curve to form a set of dynamically adjusted noise filter thresholds; and
a noise filter stage coupled to receive the enhanced image and the adjusted noise filter thresholds, wherein the noise filter stage is configured to noise filter the enhanced image using the set of dynamically adjusted noise filter thresholds to form a noise filtered enhanced image.

9. The image processing system of claim 8, wherein the dynamic threshold adjustment logic is configured to determine the GLBCE gain versus intensity curve for the enhanced image by:
dividing the digital image and the enhanced image into respective sets of K blocks;
computing an average intensity value of each block;
dividing point-wise the K average intensity values of the enhanced image by the K average intensity values of the digital image to form a set of GLBCE gain versus intensity values; and
fitting a curve to the GLBCE gain versus intensity values to form the GLBCE gain versus intensity curve.

10. The image processing system of claim 8, wherein the GLBCE gain versus intensity curve is approximated as a linear curve in a least squares criterion.

11. The image processing system of claim 8, further comprising a display screen coupled to the noise filter stage, wherein the display screen is configured to display the noise filtered enhanced image.

12. The image processing system of claim 11 further comprising a camera coupled to the image pipeline.

13. The image processing system of claim 11 being comprised within a mobile handset.

14. An image processing system comprising:
means for receiving a digital image;
means for performing global and local brightness and contrast enhancement (GLBCE) on the digital image to form an enhanced image, wherein the GLBCE applies local gain values to the digital image based on local intensity values;
means for determining a GLBCE gain versus intensity curve for the enhanced image;
means for adjusting a set of noise filter thresholds in response to the GLBCE gain versus intensity curve to form a set of dynamically adjusted noise filter thresholds; and
means for noise filtering the enhanced image using the set of dynamically adjusted noise filter thresholds to form a noise filtered enhanced image.

15. The image processing system of claim 14 further comprising means for displaying the noise filtered enhanced image.

* * * * *